United States Patent
Marbach et al.

(10) Patent No.: US 6,961,633 B1
(45) Date of Patent: Nov. 1, 2005

(54) REMOTE MONITORING OF FACTORY AUTOMATION USERS

(75) Inventors: Alain Marbach, Belmont, MA (US); Richard A. Baker, West Newbury, MA (US)

(73) Assignee: Schneider Automation Inc., North Andover, MA (US)

( * ) Notice: Subject to any disclaimer, the term of this patent is extended or adjusted under 35 U.S.C. 154(b) by 653 days.

(21) Appl. No.: 09/711,786

(22) Filed: Nov. 13, 2000

(51) Int. Cl.[7] .............................................. G08B 1/08
(52) U.S. Cl. ........................... 700/97; 700/116; 380/4; 709/223
(58) Field of Search ...................... 700/116, 97; 380/4; 709/223, 219

(56) References Cited

U.S. PATENT DOCUMENTS

| | | | | |
|---|---|---|---|---|
| 5,103,476 A | * | 4/1992 | Waite et al. | ................... 705/59 |
| 5,790,664 A | * | 8/1998 | Coley et al. | ................. 709/203 |
| 5,887,165 A | * | 3/1999 | Martel et al. | ................ 713/100 |
| 6,038,486 A | * | 3/2000 | Saitoh et al. | .................. 700/96 |
| 6,442,696 B1 | * | 8/2002 | Wray et al. | .................. 713/201 |

FOREIGN PATENT DOCUMENTS

| | | |
|---|---|---|
| WO | WO 99/060459 | 11/1999 |
| WO | WO 02/039238 | 5/2002 |

OTHER PUBLICATIONS

"Java and Programmable Automation Controllers," CiMax: Edition Terrain, No. 13—May-Jun. 1997, copy in French and translated copy.
Certificate of Accuracy of translation from Merrill Corporation, dated May 19, 2004.

* cited by examiner

*Primary Examiner*—Leo Picard
*Assistant Examiner*—Michael D. Masinick

(57) ABSTRACT

A method and system for monitoring a factory automation product via a communications network. The factory automation product is installed at an installation site having an installation site address and includes identifiable information such as a product number, a version number, a serial number and a MAC address. By obtaining the installation site address and the identifiable information, it is possible to associate the installation site address to the factory automation product based on the identifiable information. Based on the installation site address, it is possible to determine whether the factory automation product is used in violation of licenses.

28 Claims, 3 Drawing Sheets

REMOTE MONITORING OF FACTORY AUTOMATION USERS

FIELD OF THE INVENTION

The present invention relates generally to a method and system for monitoring users of factory automation products and, in particular, to such monitoring over the Internet and the like.

BACKGROUND OF THE INVENTION

A local area network system, such as the Ethernet, can be used for industrial control applications. Such a network system can be used to enable programmable controllers, host computers, control devices, such as adjustable frequency drives, and other automation devices to communicate through the production areas of an industrial plant. The devices connected together in such a communication link are generally referred to as "nodes". Each node has a unique Media Access Control (MAC) address as an identifier of the node to allow messages from one node to be sent to another. In an automated factory where a plurality of automation devices are used to perform a variety of intended functions, each automation device has a controller, such as a programmable logic controller (PLC), to communicate with a controlling workstation or the PLC of another automation device. Furthermore, the PLC includes a software program to control the automation device in performing the intended function.

In a small, enclosed communications network such as the local area network system, any automation device can be easily tracked down by a monitoring mechanism within the network using the MAC address of the device. However, it is not as easy to keep track of a factory automation device from the outside of that local area network system. It is even more difficult to monitor a factory automation product that does not have a MAC address or other address accessible via a communications network. For example, it is rather difficult for the manufacturer of a software program or other similar factory automation product to identify the user of the product in order to determine whether the product is used in violation of licenses, or to notify the user of product safety or quality issues. Furthermore, it is also desirable for the manufacturer to determine whether the product is being illegally duplicated, or whether the product is used in compliance with an export license.

Thus, it is advantageous and desirable to provide a method and system for monitoring the users of factory automation products through a communications network such as the Internet.

SUMMARY OF THE INVENTION

The first aspect of the present invention is a method for monitoring a factory automation product over a communications network, wherein the factory automation product has identifiable information such as a product number, a product version, a serial number, or a Media Access Control (MAC) address, and wherein the product is installed for use at an installation site having an installation site address. The method comprises the steps of:
  obtaining the installation site address and the identifiable information; and
  associating the installation site address to the factory automation product based on the identifiable information.

It is possible to obtain the identifiable information from a registration process, wherein an applet is delivered to the user of the product, requiring the user to register the product over the internet via an email or a web browser form.

It is possible to obtain the identifiable information from a message provided by an embedded mechanism, which is embedded in the product and capable of providing the message over the communications network.

It is possible to obtain the installation site address from a signal provided by a site locator associated with the product.

It is also possible to obtain the installation site address from the IP address of the installation.

Preferably, the identifiable information is stored in a database so as to allow a search device to determine whether one or more units have been produced based on the product without authorization.

It is possible to generate one or more information lists based on the identifiable information stored in the database using customer registration over the internet, the MAC addresses or IP addresses so that the lists can be used to check for export compliance, for license violation and to notify the customer of quality and safety problems.

The second aspect of the present invention is a system for monitoring a factory automation product having identifiable information over a communications network, wherein the product is installed at an installation site address, and wherein the product is licensed for use at an authorized site address. The system comprises:
  a first means for identifying the identifiable information and for providing first data indicative of the identifiable information;
  a second means for identifying the installation site address and providing second data indicative of the installation site address; and
  a third means, responsive to the first and second data, for associating the identifiable information with the factory automation product so as to associate the factory automation product to the installation site address.

Preferably, the second means comprises a physical site locator associated with the factory automation product.

Preferably, the first means comprises a mechanism, embedded in the automation product, for providing a message containing the first data over the communications network.

Preferably, the first means comprises a mechanism capable of requiring a user of the factory automation product to provide the identifiable information in a product registration process, thereby allowing the first means to obtain the identifiable information.

The present invention will become apparent upon reading the description taken in conjunction with FIGS. 1 to 4.

DETAILED DESCRIPTION

Figure 1:
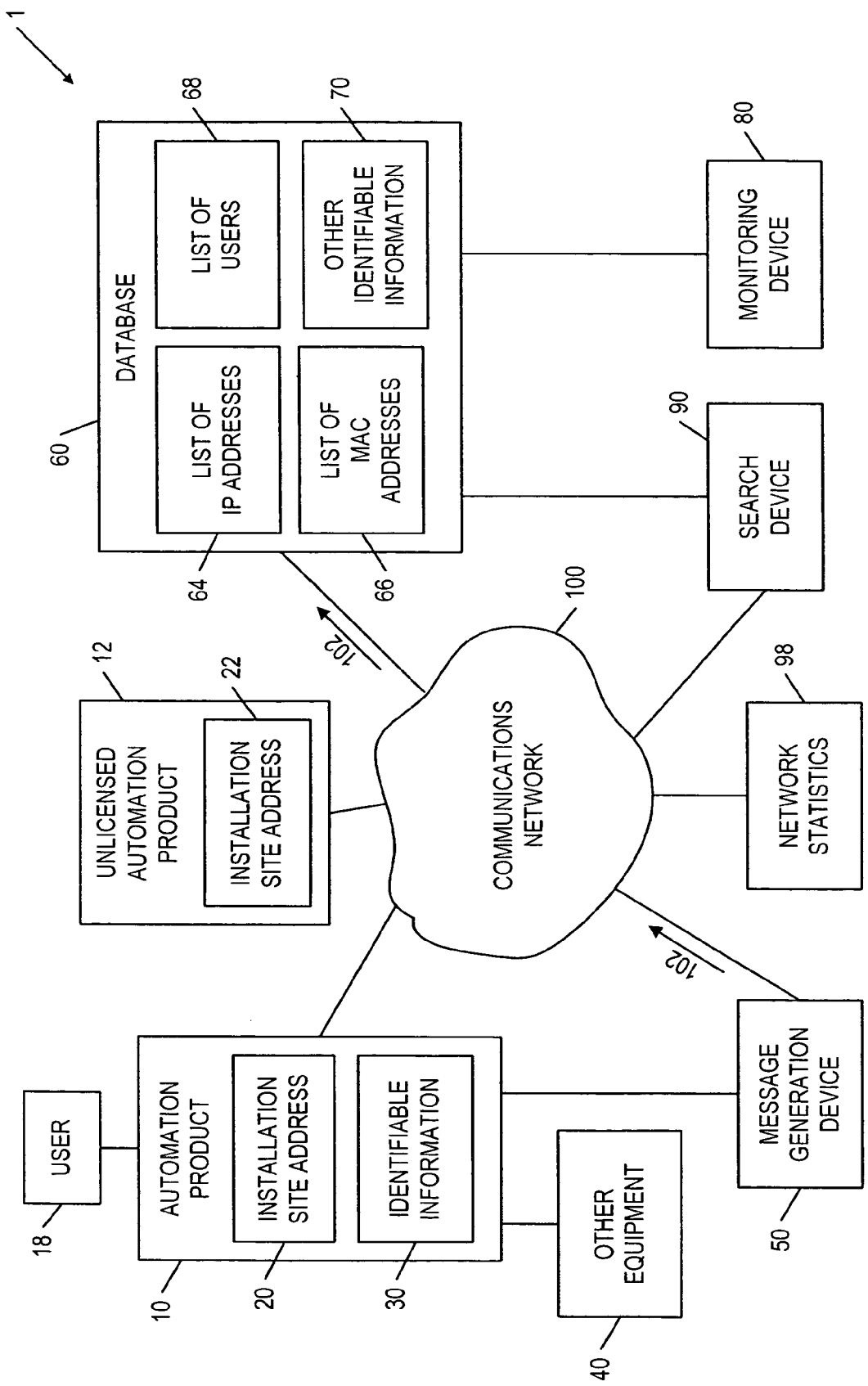
FIG. 1 is a diagrammatic representation illustrating the system for monitoring a factor automation device.

The system 1 for monitoring a factory automation product 10, according to the present invention, is shown in FIG. 1.

Figure 3:
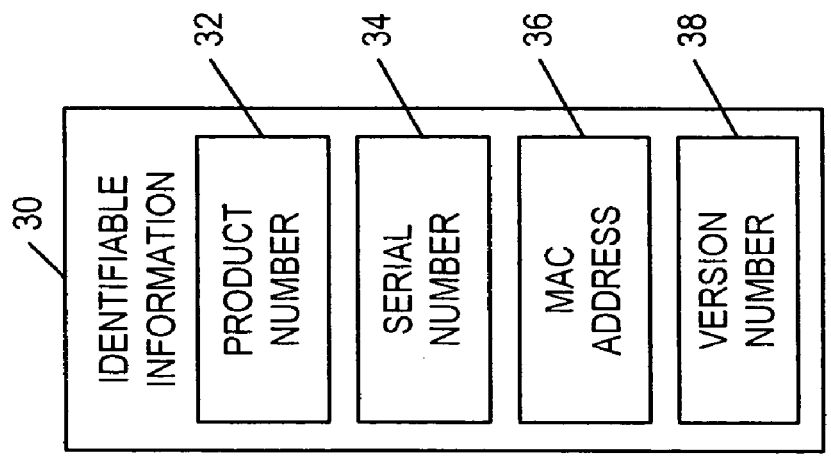
FIG. 3 is a diagrammatic representation illustrating the message generation device.
Figure 2:
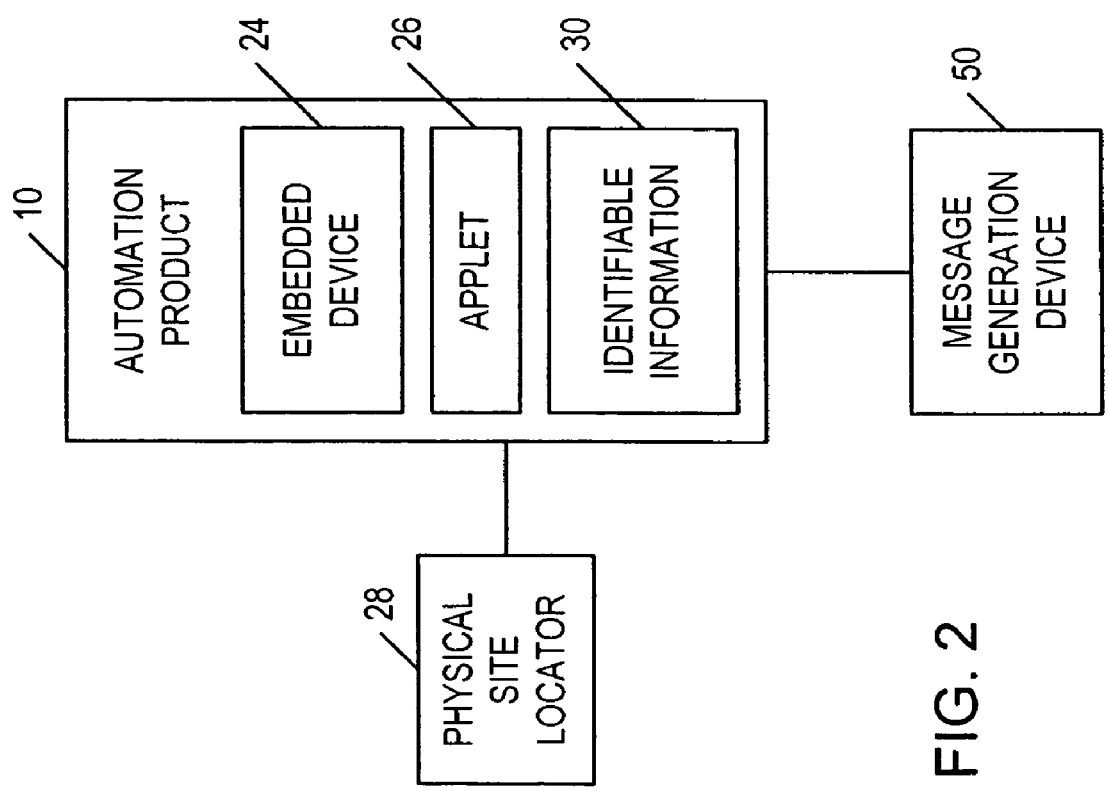
FIG. 2 is a diagrammatic representation illustrating the identifiable information.

The factory automation product 10 is installed at an installation site, the address of which is denoted by reference numeral 20, wherein the installation site address 20 can be obtained by a device 50, which is capable of generating a message 102 containing the installation site address 20 and sending the message 102 over a communications network 100. The factory automation product 10 can be a software program or a piece of hardware such as a programmable logic controller (PLC), a frequency drive, a host computer or other automation device. It is preferred that the factory automation product 10 can be associated with identifiable information 30 such as a product number 32, a serial number 34, a MAC address 36, or a product version 38, as shown in FIG. 3. It is preferred that the message 102 also contains the identifiable information associated with the factory automation product 10. The installation site address 20 can be the IP address of the installation or a physical site address identifiable by a physical site locator 28 (FIG. 2). The physical site locator can be a global positioning system (GPS), a Time Difference Of Arrival (TDOA) device, or other Personal Locator System (PLS). The physical site locator is well known in the art.

It is preferred that the installation site address 20 and the identifiable information 30 are provided to the manufacturer of the factory automation product 10 with minimal intervention by the user 18 of the product 10. It is desirable for the manufacturer to check the installation site address 20 of the factory automation product 10 in order to determine whether the installation site address 20 is in violation of licenses. This process can be used for monitoring export license violations or other license violations. Furthermore, by knowing the IP address of the installation, it is possible for the manufacturer of the factory automation product 10 to notify the customer of product safety or quality issues. A monitoring mechanism or device 80, responsive to the message 102, is used to keep track of the installation site address of the factory automation product 10 and store the installation site address in a database 60. The IP address and the MAC address contained in the message 102 can also be stored in the database 60. The list of IP addresses and the list of MAC addresses are denoted by reference numerals 64, 66, respectively. Other useful information 70, such as the web-site address or Uniform Resource Locator (URL), the information on other equipment 40 connected to the factory automation product 10, network statistics 98 regarding the use of the factory automation product 10 and a configuration of the factory automation product 10, can also be loaded into the database 60. A search device 90, similar to a web spider, which is used to search the world-wide web over the Internet, can be coded to take the information in the database 60 and search IP addresses close to the IP address, as listed in the list 64 in the database 60, for additional units that have not been registered. The addresses close to the IP address are denoted by reference numeral 22, and the additional units are denoted by reference numeral 12. In that way, it is possible to determine whether the products are used in compliance with licenses. Moreover, the search device 90 can also use each of the MAC addresses that are assigned by the manufacturer to the products, as listed in the list 66, to search for additional units based on the message 102. If additional units are found, they can also be entered into the database 60.

The database 60 can then be cross referenced with public files, available on the Internet, that list the owners of the IP addresses. The addresses of the owners of the IP addresses, can also be entered into the database 60 in a list 68. With the database 60, it is possible to run reports which show where the factory automation product 10 is actually located, including checking that it is not shipped to locations in violation of export licenses;

cross reference with sales files to make sure that each factory automation product 10 is legally purchased and that illegal copies of the factory automation product 10 are not made; and notify customers when safety or quality problems occur.

It is possible that, for each factory automation product 10 that the manufacturer sells, an applet 26 is delivered to the user 18, requiring the user 18 to register the product 10 over the communication network 100 via email or a web browser form. It that way, the message 102 is generated in the registration process without intervention of the user 18. It is also possible that the factory automation device 10 is embedded with a mechanism 24, which is capable of generating the message 102. The physical site locator 28, the applet 26 and the embedded mechanism 24 can be associated with the factory automation product 10 or the message generation device 50, as illustrated in FIG. 2.

Figure 4:
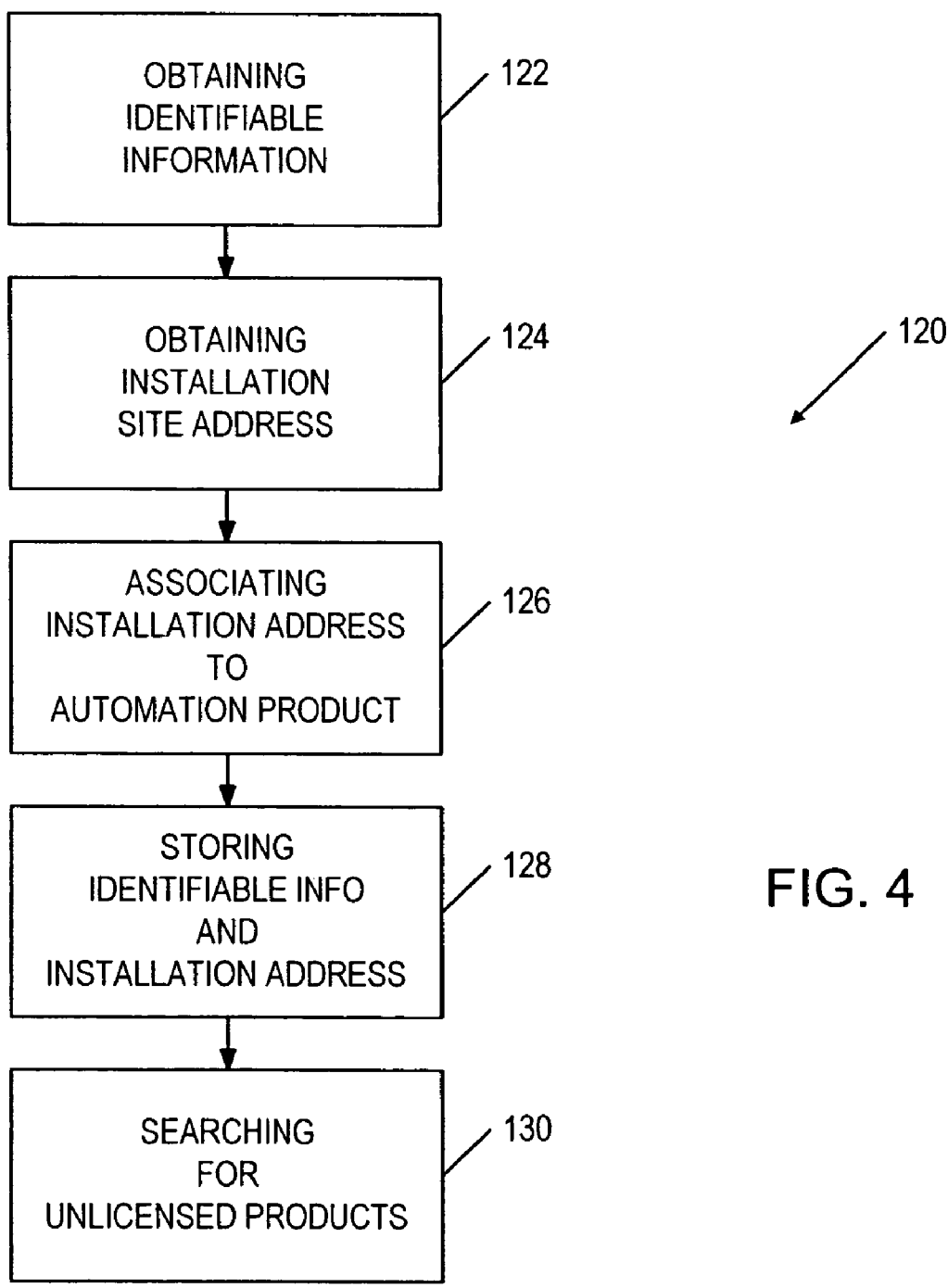
FIG. 4 is a flow chart illustrating the method for monitoring a factory automation device.

FIG. 4 is a flow chart illustrating the method 120 for monitoring the factory automation product 10 over a communication network, wherein the factory automation product 10 is installed at an installation site and can be associated with identifiable information. As shown in FIG. 4, the identifiable information is obtained at step 122. The installation site address is obtained at step 124. Associating the installation site address to the factory automation product 10 based on the identifiable information is carried out at step 126. Furthermore, it is preferred that the identifiable information and the installation site address are stored in a database at step 128 so as to allow a search device to search, at step 130, for additional units of the factory automation product 10 that are not licensed for use.

In summary, the present invention provides a method and system, which allows a factory automation manufacturer to search the Internet, or other communications network, to identify actual users of its products. The factory automation products can be software programs or automation devices such as PLCs, frequency drives or other devices, microcontrollers, counter/interrupt inputs, host computers, electrical transmitters, power supplies, terminators, connectors, sensors, relays, solenoids, transducers, contacts, strain gauges and other gauges, valves, message displays, operator keypads, operator interface panels, thermocouples, resistance temperature devices, switches such as pressure switches, level switches, flow switches, limit switches and proximity switches, motor starters, motor controllers, single/multi-axis motion controllers and modules, I/O devices and modules, I/O processors, circuit breakers, or other automation components and equipment. The identifiable information associated with the factory automation product includes the product number, the product version, the serial number, and the MAC address assigned to the product. However, other identifiable information, such as the configuration of the host computer, can also be used for product monitoring. With such monitoring of factory automation products, a user list for a factory automation manufacturer can be automatically generated. The user list can be generated based on customer registration over the Internet, IP addresses, or assigned MAC addresses. By polling the IP address list, it is possible to fill in additional information on the list. The user list can be used to check for export compliance and license violations and to notify the users of quality and safety problems.

Although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of monitoring a factory automation product via a communications network, wherein the factory automation product includes identifiable information associated therewith, said method comprising the steps of:
   installing the factory automation product at an installation site having an installation site address;
   searching for the identifiable information at a plurality of site addresses on the communications network by a monitoring mechanism;
   obtaining the identifiable information;
   identifying the installation site address; and,
   associating the installation site address to the factory automation product based on the identifiable information.

2. The method of claim 1, wherein the identifiable information comprises a MAC address assigned to the product.

3. The method of claim 1, wherein the identifiable information comprises a serial number.

4. The method of claim 1, wherein the identifiable information comprises a version number of the factory automation product.

5. The method of claim 1, wherein the identifiable information comprises a product number.

6. The method of claim 1, wherein the installation site address is an IP address of the installation site.

7. The method of claim 1, wherein the factory automation product comprises a control device.

8. The method of claim 1, wherein the factory automation product comprises a software program.

9. The method of claim 1, wherein the factory automation product comprises a host computer.

10. The method of claim 6, further comprising the step of searching a further site address based on the IP address in order to determine whether the product is also used at the further site address.

11. The method of claim 10, further comprising the step of comparing the product used at the installation site address and the product used at the further site address with a sales file for determining whether said products are legal copies.

12. The method of claim 2, further comprising the step of searching for an additional unit of the product based on the MAC address.

13. The method of claim 1, wherein a user of the factory automation product is required to register the factory automation product over the communications network, and wherein the identifiable information is obtained through said registration.

14. The method of claim 1, wherein a user of the factory automation product is required to register the factory automation product over the communications network; and wherein the installation site address is obtained through said registration.

15. The method of claim 1, wherein the factory automation product is provided with a location identification device capable of providing a signal containing address-related information, said method further comprising the step of receiving the signal in order to obtain the installation site address.

16. The method of claim 1, wherein the factory automation product is provided with an embedded mechanism capable of providing a message indicative of the installation site address over the communications network, said method further comprising the step of obtaining the message in order to obtain the installation site address based on the obtained message.

17. The method of claim 1, wherein the factory automation product is provided with an embedded mechanism capable of providing a message indicative of the identifiable information over the communications network, said method further comprising the step of obtaining the message in order to obtain the identifiable information based on the obtained message.

18. The method of claim 1, wherein the factory automation product is connected to an equipment, said method further comprising the step of identifying the installation site address is of the factory automation product based on the connected equipment.

19. The method of claim 1, wherein the factory automation product is associated with a Uniform Resource Locator in the communication network, said method further comprising the step of identifying the installation site address of the factory automation product based on the Uniform Resource Locator.

20. A system for monitoring a factory automation product over a communications network, said system comprising:
   an installation site having an installation site address, the factory automation product being installed at the installation site, wherein the factory automation product includes identifiable information associated therewith;
   a search mechanism for searching the communications network for the installation site address by a monitoring mechanism;
   means for providing data indicative the identifiable information;
   means, responsive to the data, for associating the installation site address to the factory automation product based on the provided identifiable information; and,
   means for searching over the communications network for an additional unit of the factory automation product which is used in violation of a product license.

21. The system of claim 20, wherein the providing means comprises a physical site locator.

22. The system of claim 20, wherein the providing means comprises an embedded device embedded in the factory automation device.

23. The system of claim 20, further comprising:
   a database for storing the identifiable information.

24. The system of claim 20, further comprising:
   a database for storing the installation site address.

25. The system of claim 20, wherein the communications network includes the Internet and the searching means includes a web search device.

26. The system of claim 20, further comprising means for notify a user of the factory automation product of safety or quality issues using the installation site address.

27. The system of claim 20, wherein further information is provided when the factory automation product is registered, said associating means further associating the factory automation product based on the further information.

28. The system of claim 20, further comprising means for determining whether the factory automation product is used in violation of licenses based on the installation site address.

* * * * *